(12) United States Patent
Stoev

(10) Patent No.: US 6,295,921 B1
(45) Date of Patent: Oct. 2, 2001

(54) JUICE EXTRACTOR FOR CITRUS FRUITS

(76) Inventor: Stoimmen N. Stoev, 5662 Etiwanda Ave. #9, Tarzana, CA (US) 91356

( * ) Notice: Subject to any disclaimer, the term of this patent is extended or adjusted under 35 U.S.C. 154(b) by 0 days.

(21) Appl. No.: 09/582,422

(22) PCT Filed: May 3, 1999

(86) PCT No.: PCT/BG99/00012

§ 371 Date: Jun. 22, 2000

§ 102(e) Date: Jun. 22, 2000

(87) PCT Pub. No.: WO99/56599

PCT Pub. Date: Nov. 11, 1999

(30) Foreign Application Priority Data

May 5, 1998 (BG) .................................................. 102427

(51) Int. Cl.[7] .............................. A23N 1/00; A47J 19/06; B30B 9/30
(52) U.S. Cl. ................................ 99/507; 99/501; 99/506; 99/581; 100/125; 100/213; 100/231
(58) Field of Search .............................. 99/495, 496, 501, 99/581, 504, 505–513; 100/98 R, 213, 288, 293, 231, 219, 125, 229 R, 131, 257

(56) References Cited

U.S. PATENT DOCUMENTS

| 2,090,913 | * | 8/1937 | Johnson | 99/507 X |
| 2,177,939 | * | 10/1939 | Johnson | 100/213 |
| 2,183,804 | * | 12/1939 | Bloomfield | 99/507 X |
| 2,220,372 | * | 11/1940 | Johnson | 100/125 |
| 2,703,522 | * | 3/1955 | Smith | 99/581 X |
| 4,961,374 | * | 10/1990 | Lee | 99/507 |

FOREIGN PATENT DOCUMENTS

| 2545017 | * | 4/1977 | (DE) . |
| 4333140 | * | 4/1977 | (DE) . |

* cited by examiner

Primary Examiner—Timothy F. Simone
(74) Attorney, Agent, or Firm—Colin P. Abrahams

(57) ABSTRACT

A juice extractor for citrus fruits includes a base, a vertical column, a cylindrical element attached to the column, and a cone-shaped juice collecting tray placed on the cylindrical element. A lower fruit holder is located on the juice collecting tray, and a perforated cone-shaped vessel is placed over the lower fruit holder. An upper fruit holder, a pressing device and a handle are also provided, the pressing device consisting of a hollow body, a fixation sleeve member and a connecting rib.

10 Claims, 6 Drawing Sheets

JUICE EXTRACTOR FOR CITRUS FRUITS

BACKGROUND OF THE INVENTION

1. Field of the Invention

The juice extractor for citrus fruits is designed for extracting the juice from citrus fruits in kitchens. restaurants, etc.

2. Description of the Prior Art

The already existing juice extractors, described in U.S. Pat. Nos. 4,961,374; 2,090,913; 2,177,939; 2,220,372, consist of a body; a cone-shaped lower bearing member attached to the upper part of the body; a lower cone-shaped fruit holder placed over the lower cone-shaped bearing member: an upper cone-shaped fruit holder, attached to an oval moving pressing member which is put in motion by a vertical rack member. The rack member passes through an opening in the body where it combines with a gear. The gear is put in motion by a shaft member, attached to a handle. There are also known devices of this kind with console attachment of the working elements. ratchet incorporated into the moving mechanism etc., but in common to all existing models, the multiplication of the hand force is performed by a rack member and a gear member. The kinematics connection of the rack and gear members and the limitations of the size of the gear member restricts the maximum strength of the pressing part. This limits the application of the existing models of juice extractors, making difficult the extraction from such fruits as grapefruits or cutting potatoes. In addition to the above mentioned limitations, small parts of the fruit pulp pass through the holes on the lower fruit holder and diminish the quality of the juice.

SUMMARY OF THE INVENTION

Subject of this invention is the improvement of the juice extractor, obtained by replacing the hard kinematics connection by a glissade connection By this replacement, an unlimited length of the movement of the pressing part, is reached without changing the necessary force. The change in the geometry of the leverage system enlarges the potential fields of application of the juice extractor. It makes possible the usage of the device for other purposes requiring greater strength like cutting potatoes and apples, or can smashing. This is made possible, because the pressure of the pressing device can reach over 1000 kg.

Another subject of this invention is the better quality of the extracted juice obtained by changing the shape of the lower fruit holder and the placement of a perforated cone-shaped extractor over it.

Another subject of this invention is the attachment of the upper fruit holder that allows easier removing for washing.

According to this invention, the juice extractor consists of a base; a vertical carrying column attached to the base; a cylindrical element, console attached to the column; a cone-shaped juice collector placed over the inner step of the cylindrical element; a lower step-cone shaped fruit holder with a tore-shaped juice collecting canal in its lower part with holes on the two lower steps and the tore-shaped canal; a perforated cone-shaped vessel, placed over the lower fruit holder; an upper fruit holder, attached to the lower flange of the pressing pipe of the pressing device; a pressing device console attached to the upper part of the supportive column, consisting of attaching sleeve member, a hollow body, a rib attaching these two details, a pressing pipe, a spring, a frictional washer, a springing element, a stop washer, a stop mechanism, a lid and an air-cushioned mechanism. The pressing pipe passes through the center of the hollow body. Over the lower flange of the hollow body is placed the spiral spring, and above it there is a frictional washer with asymmetrically placed hole in it and horizontal cylindrical axis at its opposite side. Over this washer is placed the springing element; the stop washer placed axially over the springing element; the semi-cylindrical stopping part, passing radial through the wall of the hollow body with a handle on its outer side. Over the upper flange of the hollow body is mounted the lid, and through its central opening passes the pressing pipe. Over the lower flange of the lid there is a radial semi-cylindrical canal equal to the diameter of the stopping part. Over the upper flange of the lid axially to the pressing pipe is located the cylinder of the air-cushioned mechanism. Over the upper side of he cylinder of the air-cushioned mechanism is placed a lid. Through the inner opening of the pressing pipe passes the spiral spring attached in its lower side to a fixed peg and in its upper side to the lid of the cylinder of the air-cushioned mechanism. Over the rib connecting the body and the attaching sleeve member of the pressing device is placed horizontal cylindrical hinge, attached to the handle. On the handle, parallel to the above mentioned hinge, is placed cylindrical axis connecting the hinge with the cylindrical axis of the frictional washer.

A variant of the described construction exists with an eccentric sleeve member in the back opening of the handle. This enables the change of the leverage system geometry.

DESCRIPTION OF THE PREFERRED EMBODIMENT

Figure 1:
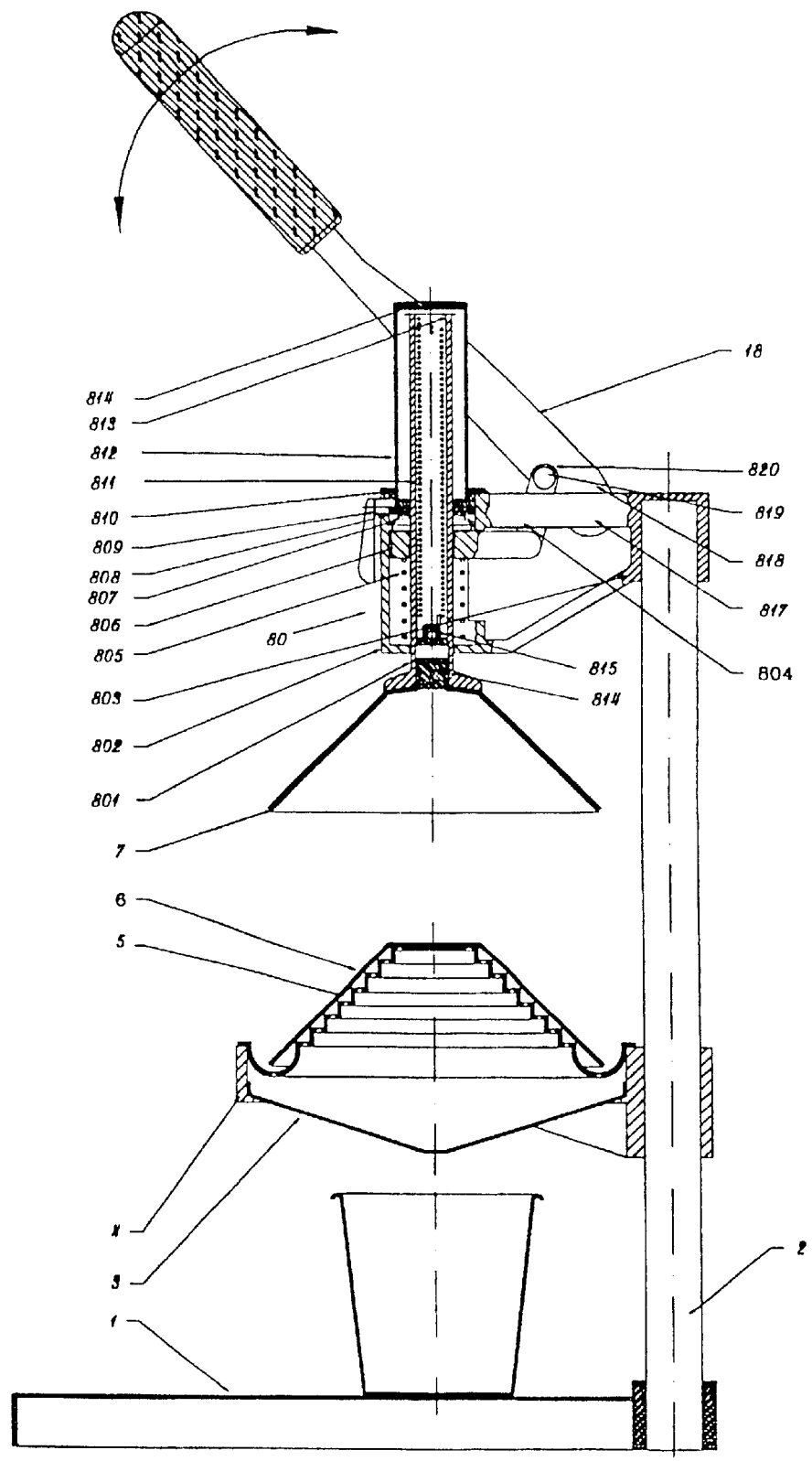
FIG. 1 shows a vertical longitudinal section of the juice extractor
Figure 2:
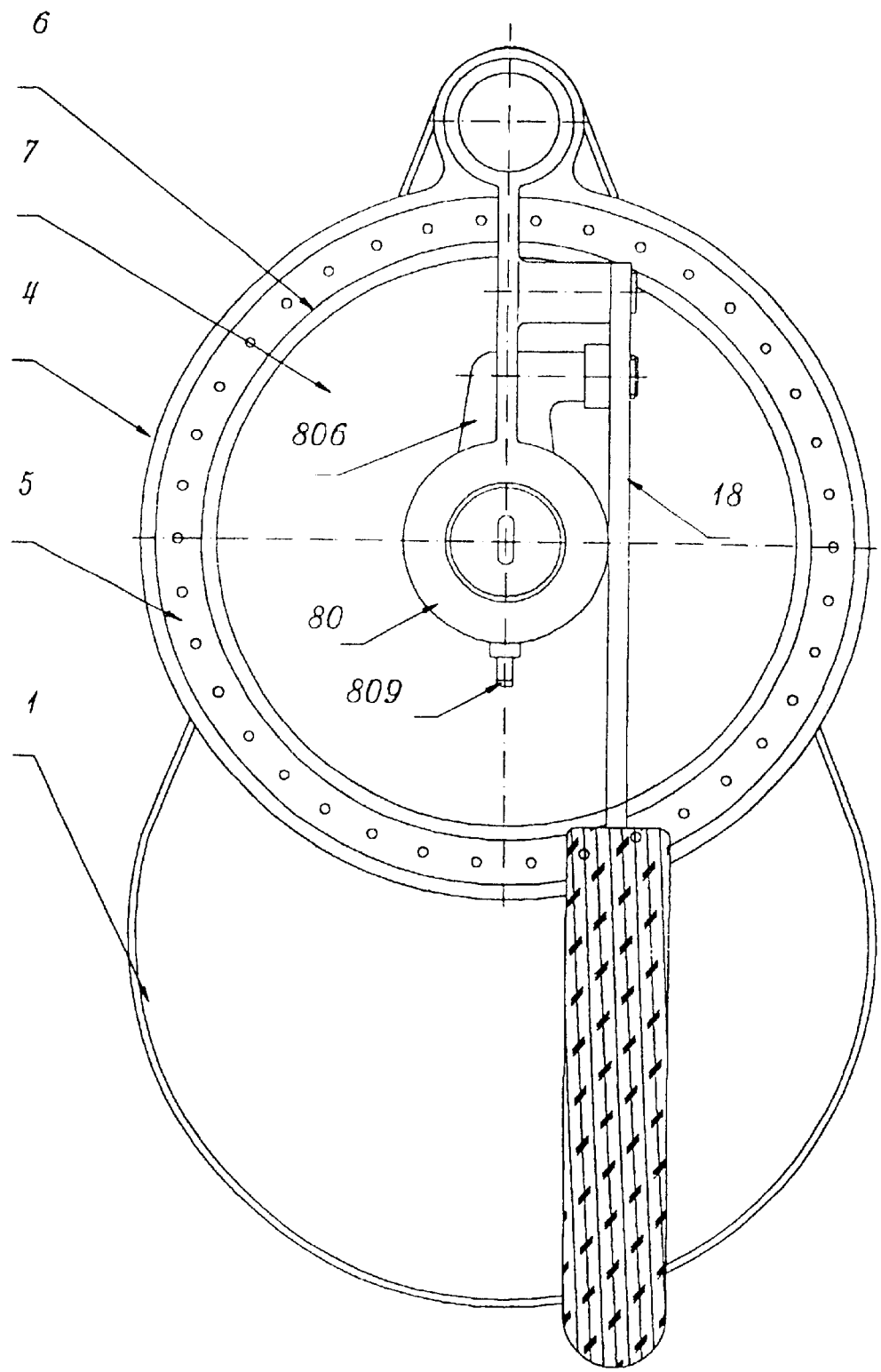
FIG. 2 is a look from above.
Figure 3A:
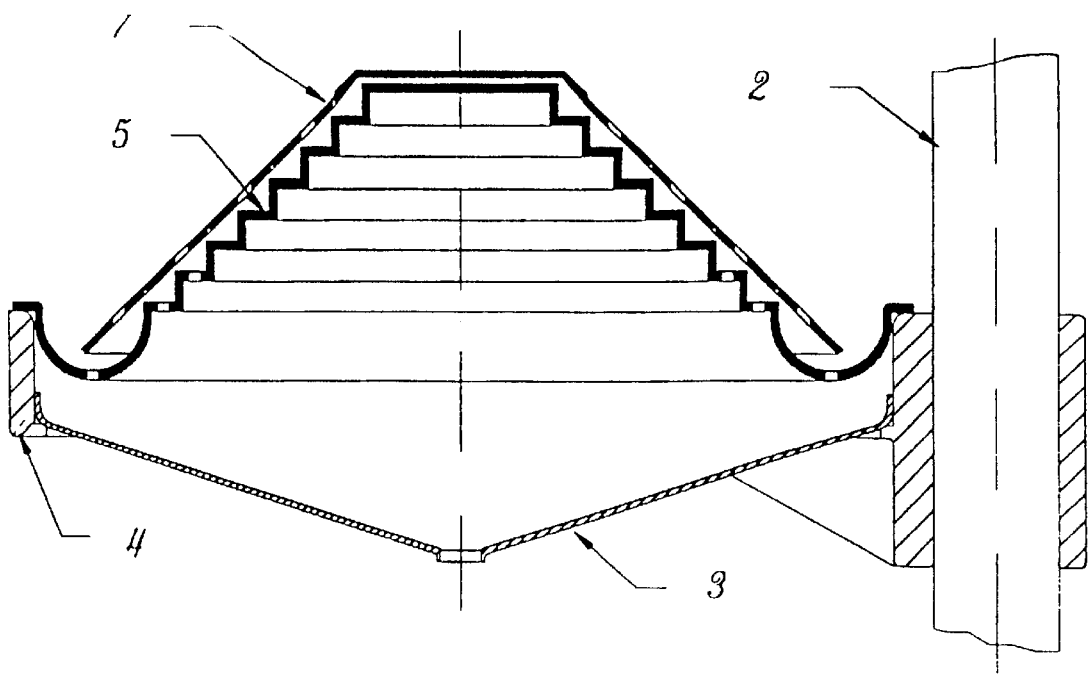
FIG. 3 shows a longitudinal section through the axis of the console cylindrical clement, the cone-shaped juice collecting tray and the perforated cone-shaped vessel.
Figure 3:
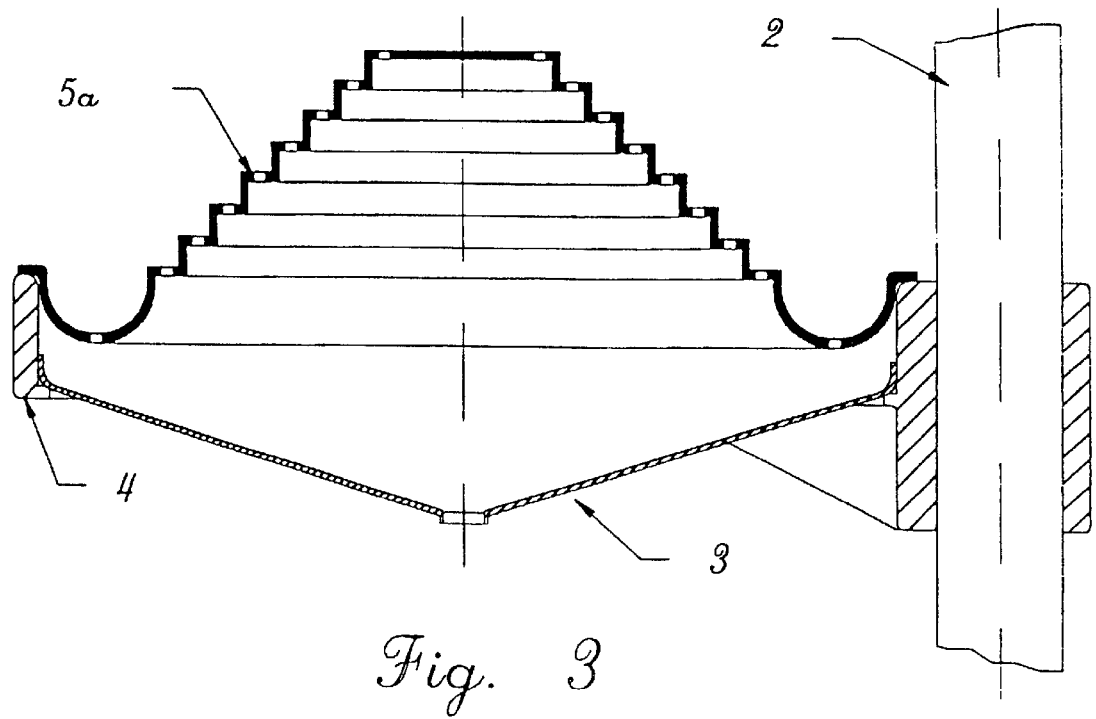

Referring to the enclosed drawings, the juice extractor consists of a base 1; a vertical carrying column 2, attached to the base; a cylindrical detail 4, a console attached to the column; a cone-shaped juice collecting tray 3 with cylindrical periphery in its upper part, placed over the inner step of the cylindrical detail 4; a step cone-shaped lower fruit holder 5 with a tore-shaped juice collecting canal with perforations in its two lower steps and the tore-shaped canal; a perforated cone-shaped vessel 6, placed over the lower fruit holder 5; an upper fruit holder 7, attached to the lower flange of the pressing pipe 801 of the pressing device 80; a pressing device 80, console attached to the upper end of the carrying column 2; through the axis of the hollow body passes the pressing pipe 801; over the lower flange of the hollow body is placed the spiral spring 805; over it is placed the frictional washer 806 with asymmetrical opening at its end, and a horizontal cylindrical axis at its other end: over the frictional washer, on the inside wall of the hollow body, there is a step limiting the frictional washer 806 in its upper position, thus assuring the axial position of the opening of the frictional washer and the pressing pipe 801; over the step is placed a springing element 807: the stop washer 808 axially placed over the springing element 807; a semi-cylindrical stop part 809, a radial passing through the wall of the hollow body 802 with a handle on its outer end; over the upper flange of the hollow body 802 there is a lid 810 through whose central opening passes the pressing pipe 802; on the lower flange of the lid there is a radial semi-cylindrical canal with a diameter equal to that of the stopping part 809; and over the upper flange, axially to the pressing pipe is placed the cylinder 812 of the air-cushioned mechanism; on the upper end of this cylinder is placed a lid 814; through the upper opening of the pressing pipe 801 passes the spiral spring 811, attached in its lower end to the fixed peg 816, and in its upper end to the lid 814 of the cylinder of the air-cushioned mechanism; attached to the upper end of the pressing pipe is the gasket 813 for the air-cushioned mechanism; over the rib 804 connecting the body 802 and the attaching sleeve member 803 of the pressing device 80, there is a cylindrical hinge 817 with a horizontal axis to which is attached the back end of the handle 818: on the handle 818, parallel to the mentioned hinge there is a cylindrical axis 819 which is connected to the hinge using the intermediary element 820; the other hole of the intermediary element is attached to the cylindrical axis of the frictional washer 806.

Figure 4:
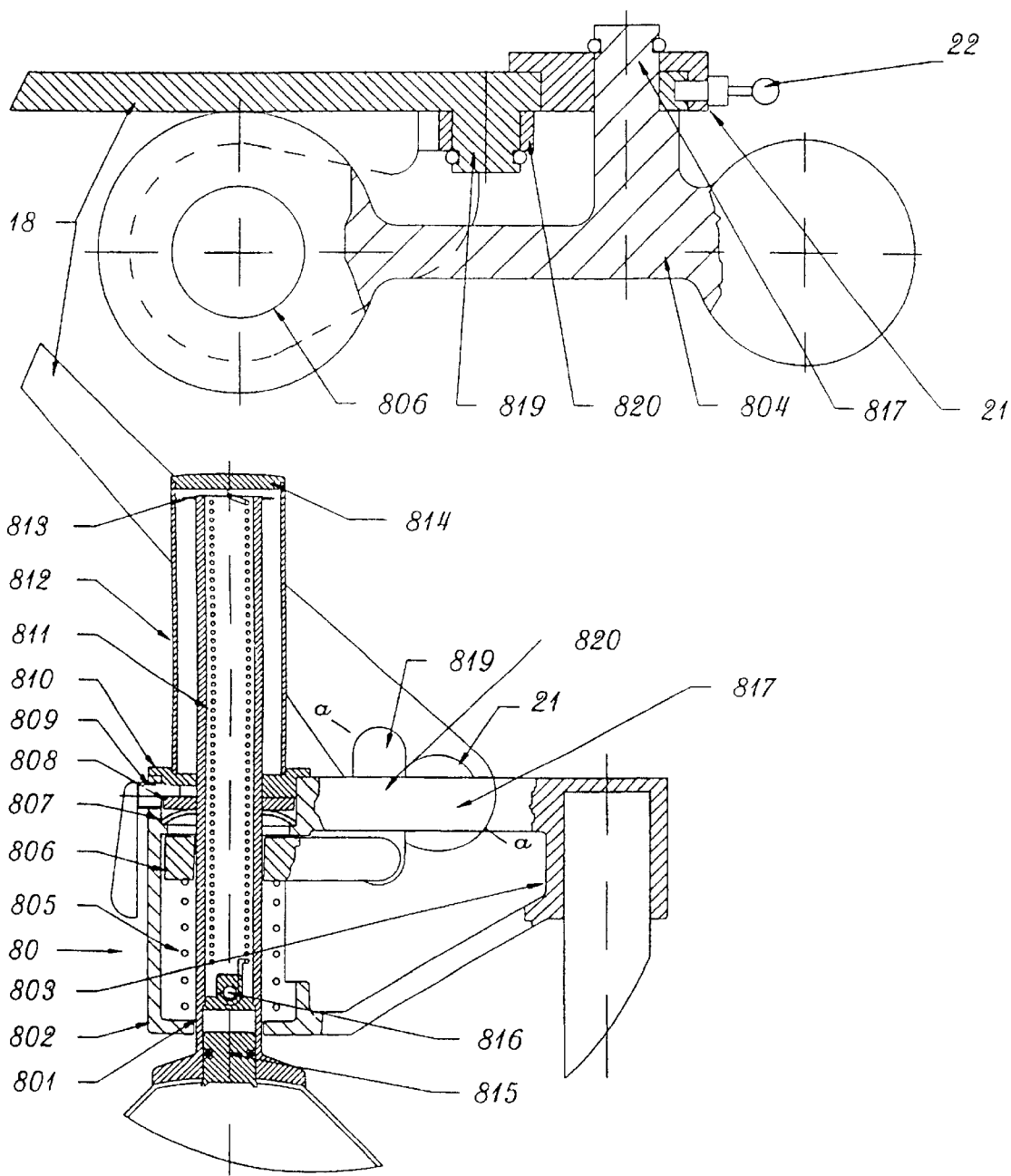
FIG. 4 is a longitudinal section of the pressing device with its changeable geometry variant.
Figure 5:
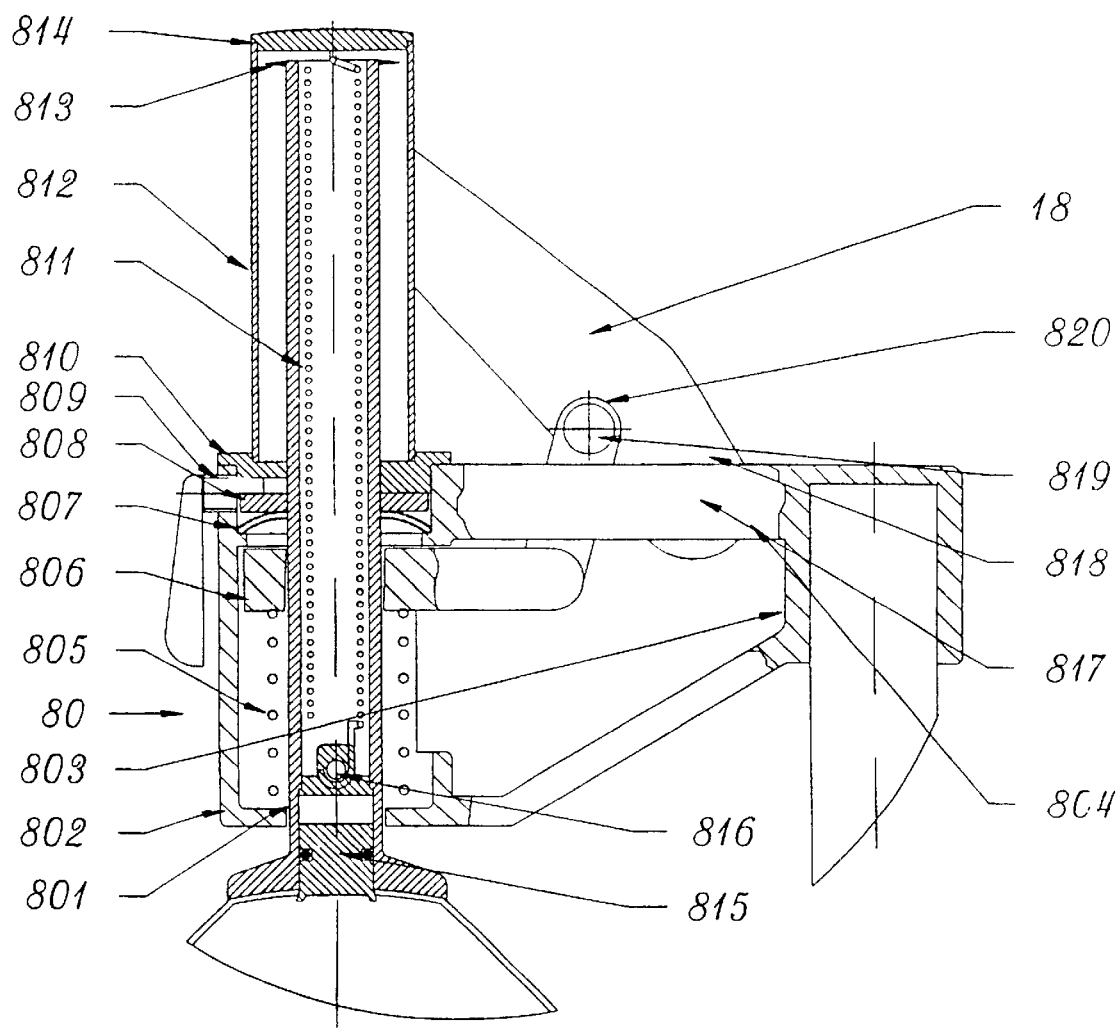
FIG. 5 shows the fixed geometry pressing device.
Figure 6:
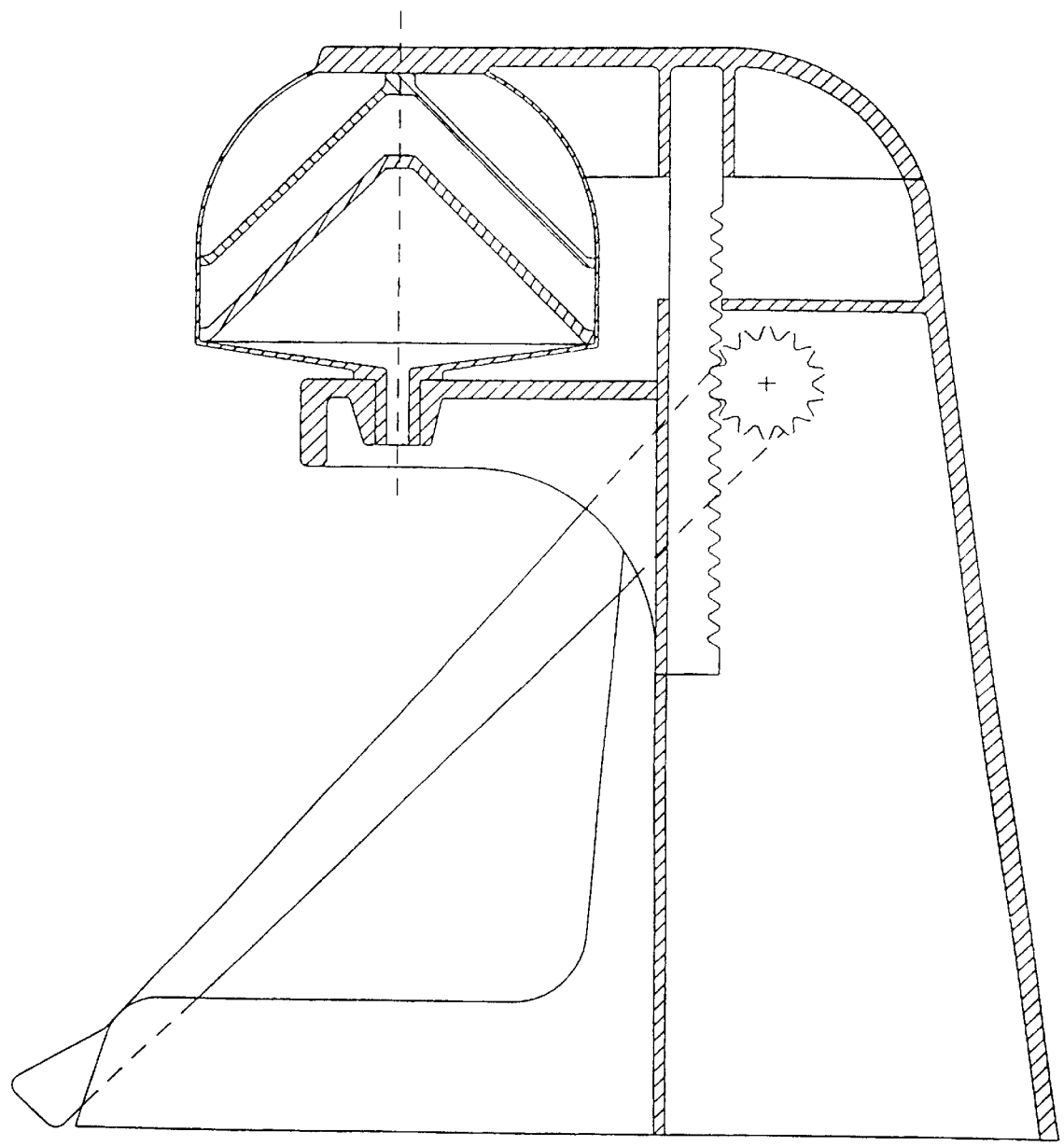
FIG. 6 show an existing patent of a citrus juice extractor moved by a rack member and a gear.

In the variant with changeable geometry of the leverage system, shown on FIG. 4 there is a washer 21 placed in the back end of the handle; the washer has an eccentric hole; through this hole passes the cylindrical hinge 817; on the cylindrical part of the flange of the washer 21, there are fixation canals in which lays the fixating peg 22; releasing the washer by the peg, one can change the ratio of lengths of the lever and its base point, and thus one can set the strength needed regarding the usage of the device.

What is claimed is:

1. Juice extractor for citrus fruits including a base, a vertical column, a cylindrical element attached to the column, a cone-shaped juice collecting tray placed on the cylindrical element, a lower fruit holder placed on the juice collecting tray, a perforated cone-shaped vessel placed over the lower fruit holder, an upper fruit holder, a pressing device and a handles characterized by the fact that the pressing device (80) consists of a hollow body (802), a fixation sleeve member (803) and a connecting rib (804), through the axis of the mentioned hollow body passes the pressing pipe (801); which has a flange at its lower end, and a gasket at its upper end; inside the hollow body there is a spring (805), over the mentioned spring is placed a frictional washer (806) with asymmetrically positioned opening with a diameter equal to that of the pressing pipe, and a horizontal cylindrical axis at its opposite end over the frictional washer, on the wall of the hollow body there is a step, a springing element (807), a stop washer (808), a semi-cylindrical, a stop mechanism radially passing through the wall of the hollow body with a handle on its inner side, over the upper flange of the hollow body there is a lid (810) with radially positioned semi-cylindrical canal on its lower flange, on this lid is placed the cylinder of the air cushioned mechanism, and on this cylinder there is a lid (814), through the inner opening of the pressing pipe passes a spring (811), the upper end of this spring is attached to the lid of the air-cushioned mechanism and the lower end is attached to a peg (816), placed inside the pressing pipe, perpendicularly to the rib, there is a cylindrical hinge (817) with a horizontal axis, to this hinge socket-joint is attached a handle (18) on the back, on the handle there is an axis (819), parallel to the hinge, this axis is connected socket-joint with one of the openings of the intermediary element (820), the other opening of this chain is socket-joint connected with the horizontal axis of the friction washer (806).

2. Juice extractor, according to claim 1 including the mentioned lower fruit holder (5), having a cone-shaped step with a tore-shaped juice collecting canal at its lower end, and openings on its three lower steps and the tore-shaped canal placed freely over the mentioned cylindrical element.

3. Juice extractor, according to claim 1 including a perforated cone-shaped vessel (7) placed over the lower fruit holder.

4. Juice extractor, according to claim 1, incorporating the pressing device (80) at the back end of its handle (18) is placed the sleeve member (21) with eccentrically placed opening flange on its outer side and fixating canals on the periphery of the flange, fixating peg (22) put inside the opening of the handle (18), that disables the sleeve member from turning when working, and by the opening, the sleeve member is connected to the hinge (817) of the rib (804).

5. Juice extractor for citrus fruits including a base, a vertical column, a cylindrical element attached to the column, a cone-shaped juice collecting tray placed on the cylindrical element, a lower fruit holder (5) placed on the juice collecting tray, a perforated cone-shaped vessel placed over the lower fruit holder, an upper fruit holder, a pressing device and a handle, wherein the pressing device (80) consists of a hollow body (802), a fixation sleeve member (803) and a connecting rib (804); a pressing pipe (801) passing through the axis of the hollow body; a spring (805) inside the hollow body, a frictional washer (806) over the spring, a lid (810) over an upper flange of the hollow body and on which is placed a cylinder (812) having a lid (814), a spring (811) passing through an inner opening of the pressing pipe the upper end of which is attached to the lid of the cylinder (812) and the lower end of which is attached to a peg (816), a cylindrical hinge (817) with a horizontal axis perpendicular to the rib, and the handle (18) being attached to this hinge by a socket-joint.

6. Juice extractor, according to claim 5 wherein the lower fruit holder (5) has a cone-shaped step with a tore-shaped juice collecting canal at its lower end, and openings on three lower steps thereof, the tore-shaped canal being placed freely over the cylindrical element.

7. Juice extractor, according to claim 5 including a perforated cone-shaped vessel (7) located over the lower fruit holder.

8. Juice extractor, according to claim 5, further comprising a sleeve member (21) on the pressing device (80) at the back end of the handle (18), the sleeve member having an eccentrically placed opening flange on its outer side and fixing canals on the periphery of the flange, a peg (22) inside the opening of the handle (18) that disables the sleeve member from turning when working, and when opened, the sleeve member is connected to the hinge (817) of the rib (804).

9. Juice extractor, according to claim 5, wherein on the wall of the hollow body (802) there is a step, a springing element (807), a stop washer (808), a semi-cylindrical stop mechanism (809), radially passing through the wall of the hollow body, with a handle on its inner side, an air-cushioned mechanism, consisting of a gasket (813) on upper end of the pressing pipe (801) and cylinder (812).

10. Juice extractor, according to claim 5, having an axis (819) on the back of the handle (18) which is connected socket-joint with one of the openings of the intermediary element (820), the other opening of this element being socket-joint connected with the horizontal axis of the friction washer (806).

* * * * *